June 29, 1965   J. H. BEACH   3,192,419
SYNCHRONOUS MOTOR AND MOUNTING
Filed July 16, 1963

United States Patent Office 3,192,419
Patented June 29, 1965

3,192,419
SYNCHRONOUS MOTOR AND MOUNTING
Justice H. Beach, Canton, Ohio, assignor to The Hoover Company, North Canton, Ohio, a corporation of Ohio
Filed July 16, 1963, Ser. No. 295,424
10 Claims. (Cl. 310—9.1)

My present invention is directed to the art of small, very low powered synchronous electric motors of the type which are driven through a vibrating element which actuates a ratchet and pawl mechanism to impart synchronous rotary motion to a gear train. Such motors may be utilized to drive a suitable low powered synchronous speed load such as the mechanism of an electric clock.

As disclosed herein my invention contains various features forming the subject matter of application Serial No. 295,423, filed July 16, 1963, entitled "Synchronous Electric Motor"; application Serial No. 295,463, filed July 16, 1963, entitled "Improvements in Synchronous Electric Motor"; application Serial No. 295,359, filed July 16, 1963, entitled "Synchronous Motor with Limit Control"; and application Serial No. 295,360, filed July 16, 1963, entitled "Synchronous Motor with Self-Set Limit Control".

In small low powered synchronous motors such as those which are actuated through the vibrations of a piezoelectric element vibrating in synchronism with line frequency, the driving pawl actually travels or has an excursion of only a few thousandths of an inch during each driving stroke and drops off the segmental flank of an advanced tooth below the radial flank of the next succeeding tooth on the pawl a distance of only a few thousandths of an inch. Nevertheless, experience has shown that electric motors of this type develop a low level but penetrating noise having a frequency of 120 cycles per second and that this noise is very difficult to suppress.

Accordingly, it is a principal object of my invention to provide a housing and mounting mechanism for piezoelectric or other vibrator driven low power motors which will so isolate the noise producing sections thereof as to eliminate detectable, annoying noise features.

It is a further object of my invention to provide an economical, positive and simple mounting for a piezoelectric driver and its electrical connections which is also designed to be a poor conductor of sound. More particularly my invention includes an arrangement of piezoelectric motor in which all moving parts thereof, except an output shaft, are fully enclosed within a massive casing of sound deadening material and a single stud securely mounts the piezoelectric driver and its associated parts in the casing along with the electrical conductors for energizing the piezoelectric driver.

Other objects and advantages of my invention will become apparent as the description proceeds when taken in connection with the accompanying drawing wherein.

Figure 2:
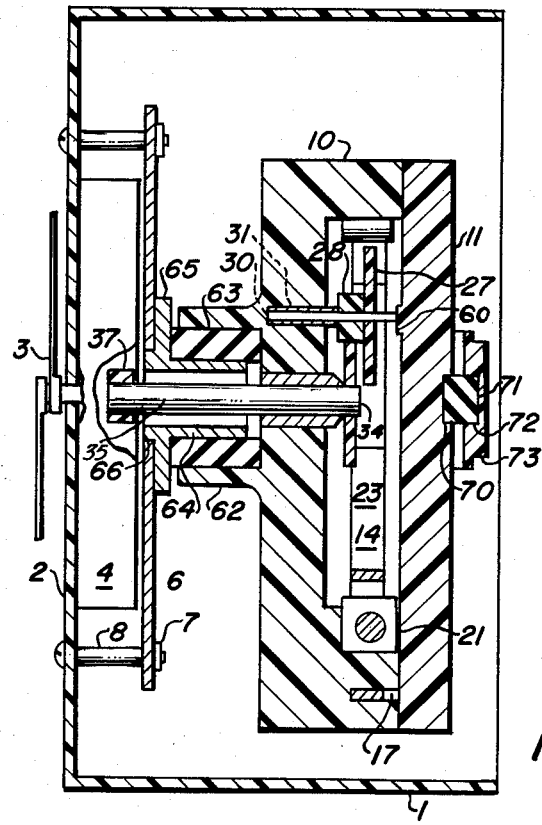
FIG. 2 is a vertical sectional view taken along the line 2—2 of FIG. 1 looking in the direction of the arrows.
Figure 3:
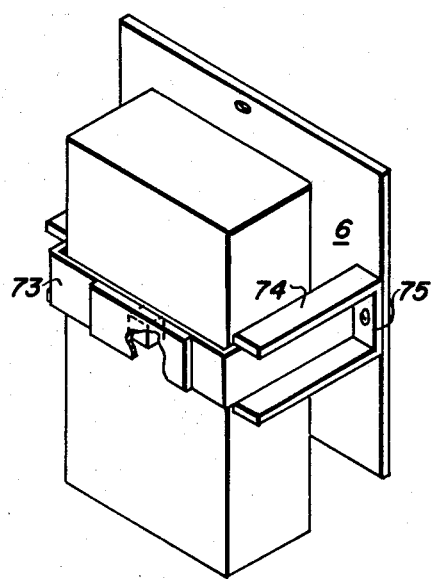
FIG. 3 is a perspective view of my motor casing and its mounting structure.

Referring now to the drawing and most particularly to FIG. 2 thereof, there is illustrated an electric clock mechanism comprising a clock casing 1 having a clock face portion 2 on which are mounted time indicating hands 3 which are mounted in a conventional manner and are driven through a conventional clock gear train here shown as a box 4 mounted on the interior or rear side of the clock face 2.

The gear train indicated generally by the box 4 is within the confines of a rigid mounting plate 6 which is the mounting for the motor to be described hereinafter. The plate 6 is supported from the clock face 2 by means of nuts and bolts 7 which have spacer collars 8 positioned between the rear side of the clock front 2 and the plate 6 in order to space the same a proper distance from the front face 2 of the clock structure.

The motor mechanism is mounted within a motor housing 10, preferably a molded plastic structure, which has a cover plate 11 secured thereto by studs which will thread into the bores 12 in the casing 10. The main casing 10 is provided with a molded recess 13 within which the operative elements of the motor are mounted.

The active element of the synchronous motor illustrated herein is a thin elongated bender type piezoelectric element 14 preferably of the type having a very thin brass center strip upon opposite faces of which piezoelectric material has been applied with the exposed outer faces of the piezoelectric material being silvered for the purpose of providing electrical contact thereto. The piezoelectric material may be of any type such as Rochelle salt, barium titanate or lead zirconatetitanate. The lower end of the element 14 is clamped between the angularly bent end portions of L-shaped mounting and conductor bars 15 and 16.

The bar 15 is mounted within an L-shaped slot 17 molded in the casing 10 and has a free end portion which terminates in an enlarged recess 18 also molded in the casing 10 and providing for access to the end of bar 15 to establish electrical connection thereto. The bar 16 engaging the other face of the piezoelectric element 14 extends into a second and larger recess 19 molded into the casing 10 to provide for ready electrical connection to the free end thereof. The bar 16 extends through a slot similar to the slot 17 where it penetrates through the solid part of the casing connecting the molded recesses 13 and 19 as shown in FIG. 1.

Figure 1:
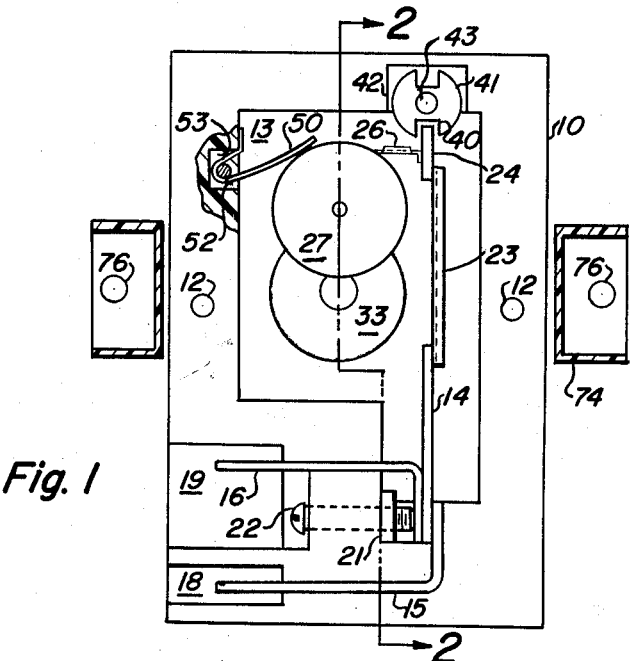
FIG. 1 is an elevational view partly in section with the closure cover removed.

As shown most clearly in FIGS. 1 and 2 the lower end of element 14 which is positioned between the bent ends of conductor bars 15 and 16 meets these parts in a downwardly extending small dimensioned extension on the lower part of recess 13. A nut 21 is seated in a complementally shaped portion of this recess and receives a securing stud 22, the head of which is positioned in the recess 19. As the stud 22 is threaded through the captive nut 21 its free end bears against the opposing face of the bent end of conductor bar 16 and clamps the conductor bars 15 and 16 and the piezoelectric element 14 in the bottom portion of the recess 13 and in tight contact with each other to provide an electrical and mechanical anchorage for these elements.

A very small thin section, light weight channel shaped extension, preferably of stainless steel, 23 is cemented to the upper free end of element 14 and at its free end carries a rubber block 24 to which it is cemented. The face of the rubber block 24 opposite to the face thereof cemented to the extender 23 carries a very fine springy light weight stainless steel sheet metal pawl 26, the free end of which bears upon a fine toothed ratchet wheel 27 to impart rotational motion thereto when the driver element 14 vibrates due to energization by connection of bars 15 and 16 to a source of alternating current.

As shown in the drawing the dimensions of the parts are not to exact scale but are greatly enlarged. In actual practice the piezoelectric element 14 is approximately seven-eighths of an inch long, the lower one-eighth of which is clamped between bars 15 and 16 and the upper eighth inch of which will be cemented to the extender 23. The ratchet wheel 27 is preferably a light weight molded plastic member having a mass less than one gram, a diameter of one-half inch and 250 ratchet teeth molded on its peripheral surface. The teeth on the surface of the wheel 27 will have a pitch slightly over six thousandths of an inch and the radial flanks thereof against which the pawl 26 abuts during the driving stroke thereof have a radial extent of approximately three thousandths of an inch.

The ratchet wheel 27 and a cooperating small spur gear 28 are each press fitted upon a small spindle 30 journaled in a bushing 31 press fitted in the wall of casing 10. The spur gear 28 meshes with a larger diameter gear 33 press fitted on the end of a shaft 34 which is journaled in a bushing 35 press fitted in casing 10. The projecting end of shaft 34 carries a gear 37 which projects into the clock gear reduction train box 4 and provides the actual power off-take element of the electric motor.

The rubber block element 24 projects above the point at which it supports the pawl 26 and its free end enters into a slot 40 formed in a cylindrical limit stop member 41 which is positioned in an extension 42 of the recess 13 and is pivotally supported upon a pin 43 secured in casing 10 in any desired manner. The purpose of this member is to limit the excursion of the pawl to an amount which exceeds one tooth pitch of the wheel 27 but is less than two teeth thereof and to compensate and adjust itself automatically for varying conditions of operation of the piezoelectric element 14, all as more fully set forth in application Serial No. 295,360.

A very light weight leaf spring 50 bears on the exposed peripheral surface of the ratchet wheel 27 and is wrapped around a pin 52 extending across a small recess 53 in casing 10. The purpose of the spring 50 is to impose a slight drag on the wheel 27 to insure that the same comes to a full stop at the completion of a driving stroke of the pawl 26 and does not tend to rotate in the reverse direction as the pawl is retracting preparatory to initiating a new driving stroke.

The recesses 42, 53, 18, 19, 13 and their extensions and the slots receiving the conductor bars 15 and 16 all extend through the right-hand face of housing member 10 as viewed in FIG. 2. The cover plate 11 completely covers and closes the portions of the recesses and slots opening through the said right-hand face of housing 10.

The seal between the members 10 and 11 should be very tight to prevent ingress of dust or other foreign materials into the motor compartment. Preferably these members are formed from a relatively dense molded plastic material having good sound absorbing and deadening properties such as a dense filled phenolic plastic. The structure of housing 10 is designed to suppress noise generated by the motor. The noise generated is unpleasant but is of low energy level as the total power consumption of the motor is only a fraction of a watt, hence the housing 10–11 is preferably constructed of a dense sound deadening material. I prefer to use a filled dense phenolic plastic for this purpose as such dense materials have good sound deadening properties, are strong and have excellent electrical insulating properties. The very mass of the housing 10–11 is important in inhibiting noise propagation since the low energy of the system, and the noise produced by it, is insufficient to vibrate this mass significantly.

The inner face of the cover plate 11 is provided with a small inwardly directed projection 60 which abuts the projecting end of the shaft 30 in order to retain the spur gear 28 against the end of the bushing 31 to position the gear wheel 28 and ratchet 27 axially.

The rear face of the casing member 10 is provided with a projecting annular collar 62 within which is mounted an anular ring of soft rubber 63 which in turn receives an annular collar 64 projecting from the face of a rigid plastic mounting disc 65. The bore in the collar 64 and disc 65 is considerably larger than the diameter of the shaft 35 so as to provide an ample air space between these elements. The disc 65 seats against the outer face of the mounting plate 6 and is provided wtih a projecting section 66 which extends into a complementally shaped opening in the plate 6 in order to position the member 65 properly relative thereto. The collar 62 is not as long as the collar 63, leaving an air space between the end of collar 62 and the facing side of the disc 65; hence, there is no direct rigid material connection between these two parts, their only connection being through the rubber collar 63 which is preferably a soft sound deadening type material.

The cover plate 11 of the motor casing is provided with a molded recess 70 within which a block 71 is seated. The block 71 is made of soft sound deadening and cushioning rubber or rubber-like material. The block 71 projects beyond the surface of cover 11 and is received within a complementally shaped recess 72 formed in the thickened center section of a U-shaped mounting bracket 73 which is preferably a molded plastic material and forms the means for securing the motor and its related parts to the plate 6. The member 73 is preferably a molded plastic material, though other materials may be utilized if desired, and is generally U-shaped so as to span the motor assembly without touching the same at any point. The rubber block 71 forms the sole direct connection between the member 73 and the motor housing. The legs of the U-shaped bracket 73 are channel shaped in section as indicated at 74 to stiffen this part of the apparatus and the feet of the channels are provided with a base section 75 which abuts the face of the plate 6 and are attached thereto by suitable studs 76. When the studs 76 are drawn up the motor is held between the U-shaped support member 73 and the face of plate 6 by two rubber members and is otherwise isolated therefrom. The foregoing action puts the rubber block 71 and rubber collar 63 under slight compression whereby these members form a firm sound deadening and shock cushioning mount for the entire motor assembly.

The manner in which the piezoelectric element 14 and the conductor bars are mounted in the housing 10 is an important feature of my invention. The driver element 14 and conductor bars 15 and 16 are readily placed in position in the housing and held while the bolt 22 is driven tight. This single operation provides the mechanical anchorage for the conductor bars and the assembly of parts carried by the driver 14 and also simultaneously makes all the internal electrical connections.

The anchorage of the conductor bars and driver assembly contacts only the dense sound deadening material of the housing 10 so as not to provide a noise path to a sound radiating surface. The conductor bars do project outside the housing 10 but do not act as noise conductors due to their mass, rigid anchorage to the housing 10 and the damping and deadening effect of the housing 10 where the bars contact the walls of the slots connecting recess 13 with recesses 18 and 19.

From the foregoing construction it will be observed that the noise produced by the pawl 26 as it strikes the radial flank of a tooth on the ratchet wheel 27 during a driving stroke or snaps down past the radial flank of a tooth on a withdrawing stroke and strikes the segmental flank of a tooth is confined entirely within the sealed-up chamber within the casing 10–11. The pawl has a rubber mount forming its only mechanical connection to any other part of the apparatus except its contact with the plastic ratchet wheel 27. Any vibrations transmitted to wheel 27 can pass only through the gear train and shaft assemblies to gear 37 and thence through that gear to the gearing in the box 4 before it can be transmitted to any surface which might act as a sound radiating surface. Any noise which might be transmitted through the rubber block 24 and hence through the piezoelectric drive element to the conductor bars and casing structure is effectively damped out because of the sound deadening qualities of the material of which the housing structure is made. Furthermore the housing structure is mounted in a cushioning rubber mount and has no direct, efficient sound conducting connection with any surface to which it might transmit noise producing vibration.

The herein disclosed mechanism effectively seals up and protects the driving mechanism of the synchronous motor, provides a sound deadening, electrical and heat insulating and shock absorbing mounting structure for these parts of the apparatus and provides no direct sound radiating surface or any effective transmission path through which noise produced within the motor mechanism can effectively be transmitted to an exterior body which might act as a sound radiating surface. Though the mounting of the motor and its associated parts is resilient and sound deadening, it is positive and effectively secures the motor in position during normal use and rough handling while at the same time cushioning the parts within the motor housing against the direct application of mechanical shock.

I claim:

1. A casing and mounting structure for a small vibratory motor comprising a massive housing completely enclosing a vibratory motor having an output shaft projecting from one wall of said housing, a supporting plate for said housing spaced therefrom, a shock absorbing and sound deadening body interposed between said housing and said supporting plate, a U-shaped bracket spanning said housing in spaced relation thereto and having its legs secured to said plate, and a body of sound deadening and shock absorbing material bearing between said housing and the bight portion of said U-shaped bracket, each of said bodies of shock absorbing and sound deadening material being in compression.

2. Apparatus according to claim 1 wherein said shaft extends through an opening in said plate in spaced relation to the walls of such opening, and said first mentioned body of sound deadening material is tubular in form and surrounds said shaft in spaced relation thereto.

3. Apparatus according to claim 2 wherein said housing is provided with a projecting collar snugly receiving said tubular body and terminating short of the projecting end of said tubular body.

4. Apparatus according to claim 2 including a plastic washer having a portion thereof projecting into the opening in said plate and surrounds said shaft in spaced relation thereto, said washer is provided with a tubular portion projecting toward said housing and terminating short thereof in spaced relation to said shaft and said tubular portion is snugly received within said tubular member.

5. In a piezoelectric motor having a housing, a ratchet wheel rotatably supported by the housing, a pawl operatively engaging the ratchet wheel, a piezoelectric driver element having opposite faces thereof plated with conducting material, means mounting said pawl on said driver element, a pair of conductor bars having end portions each contacting a face of said driver element, a captive nut in said housing and a single bolt threaded through said nut into engagement with the end portion of one of said bars to press the end portions of said bars into firm contact with said driver element and the face of the other conductor bar.

6. In a synchronous electric motor, a housing, a ratchet wheel rotatably mounted in said housing, a piezoelectric driver element having opposite faces thereof covered with a film of electric conducting material, a pawl supported by said driver element, a pair of mounting and conductor bars extending through a wall of said housing and having portions in said housing in spaced relation to each other with said portion of one of said bars bearing against an interior wall of said housing, said driver element being positioned to place said pawl in operative engagement with said ratchet wheel and having one portion thereof between and in engagement with said portions of said bars, and a pressure applying means bearing between a wall of said housing and said portion of the other of said bars to compress said bars and driver element together and against the said interior wall to mount said bars and driver element in said housing and to establish electrical contact therebetween.

7. Apparatus according to claim 6 wherein said housing is constructed of a dense plastic material having sound deadening properties and said pressure applying means has no physical contact with any metallic part of the apparatus other than one of said conductor bars, and said driver element, and said portions of said bars are entirely enclosed within said housing.

8. Apparatus according to claim 6 wherein said pressure applying means comprises a captive nut in said housing bearing against an interior wall of said housing facing and spaced from the wall against which said portion of said one conductor bar bears, and a stud having a portion accessible from the exterior of said housing threaded through said captive nut and bearing against the outer face of said portion of the other of said conductor bars.

9. A synchronous drive motor assembly comprising a casing having a body part and a removable cover part, a synchronous vibratory type electric motor in said casing including a power output shaft extending through a wall of said casing, a supporting plate having a hole therein through which said shaft extends, said hole being larger than said shaft to provide an air space therebetween, a projecting tubular collar on said casing surrounding a portion of said output shaft in spaced relation thereto, a tubular member of soft rubber-like material snugly received in said tubular collar and projecting outwardly beyond the end thereof into contact with said supporting plate, a U-shaped bracket spanning the casing in spaced relation thereto and having the ends of its leg portions secured to said plate and a rubber block interposed between said casing and the bight portion of said bracket to provide a shock absorbing mounting for said casing.

10. In a synchronous electric motor of the type having a housing, a rotatably mounted ratchet wheel mounted in said housing, a power output shaft projecting outwardly through one wall of said housing, a gear train enclosed within said housing arranged to drive said shaft from said ratchet wheel, an electrically energized drive mechanism of the type which vibrates synchronously with the frequency of an energizing alternating current drivingly coupled to said pawl, electrical conductors extending through a wall of said housing, said housing being constructed of dense sound deadening material and completely enclosing said ratchet, pawl and drive mechanism assembly, a supporting plate having an opening through which said shaft projects without contacting said plate, means securing said housing to said plate consisting of a compressible resilient body interposed between one wall of said housing and said plate, a compressible resilient body bearing on the wall of said housing opposite said one wall thereof, and a member in spaced relation to said housing connected to said plate and exerting a compressive force on said second mentioned resilient body.

References Cited by the Examiner

UNITED STATES PATENTS 2,491,453  12/49  Knobel _____ 58—53

OTHER REFERENCES

Piezo-Electricity, pages 673–674, by W. G. Cady, published by McGraw-Hill Company, 1946.

MILTON O. HIRSHFIELD, *Primary Examiner.*